United States Patent
Shiobara et al.

(10) Patent No.: US 6,952,822 B2
(45) Date of Patent: Oct. 4, 2005

(54) PROGRAM INSTALLATION METHOD, PROGRAM INSTALLATION SYSTEM, PROGRAM EXECUTING APPARATUS, AND STORAGE MEDIUM

(75) Inventors: Tomomi Shiobara, Kawasaki (JP); Yusuke Kawasaki, Kawasaki (JP); Shigeru Hashimoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 482 days.

(21) Appl. No.: 09/774,629

(22) Filed: Feb. 1, 2001

(65) Prior Publication Data

US 2002/0002702 A1 Jan. 3, 2002

(30) Foreign Application Priority Data

Jun. 30, 2000 (JP) .......................................... 2000-199265

(51) Int. Cl.[7] .................................................. G06F 9/44
(52) U.S. Cl. ........................ 717/168; 713/176; 713/177; 380/42; 380/43
(58) Field of Search ........................ 717/120, 168–178; 713/176–177; 380/42–43

(56) References Cited

U.S. PATENT DOCUMENTS 5,881,287 A * 3/1999 Mast .......................... 717/127
6,295,645 B1 * 9/2001 Brewer ........................ 717/178
6,347,398 B1 * 2/2002 Parthasarathy et al. ...... 717/178
6,381,742 B2 * 4/2002 Forbes et al. ................ 717/176
6,584,495 B1 * 6/2003 Bisset et al. ................. 709/217

FOREIGN PATENT DOCUMENTS

| EP | 0 813 133 A2 | 12/1997 |
| JP | 6-12348 | 1/1994 |
| JP | 10-91427 | 4/1998 |

* cited by examiner

*Primary Examiner*—Kakali Chaki
*Assistant Examiner*—Lawrence Shrader
(74) *Attorney, Agent, or Firm*—Arent Fox PLLC

(57) ABSTRACT

The installation method makes possible the installation of new programs, while maintaining security, in a system LSI device. The installation method comprises a step for receiving the signature data 7 of a program 6, a step for checking for interference with other already installed programs on the basis of said signature data 7, and a step for authorizing the installation of programs with which there is no interference. A declaration of signature data is elicited from a program being installed; a check for interference among programs is performed based on this, authentication is performed, and the installation of interfering programs is prevented or the installation of programs with which there is no interference is executed. It therefore becomes possible to install new programs while protecting high-security programs.

25 Claims, 9 Drawing Sheets

FIG. 5

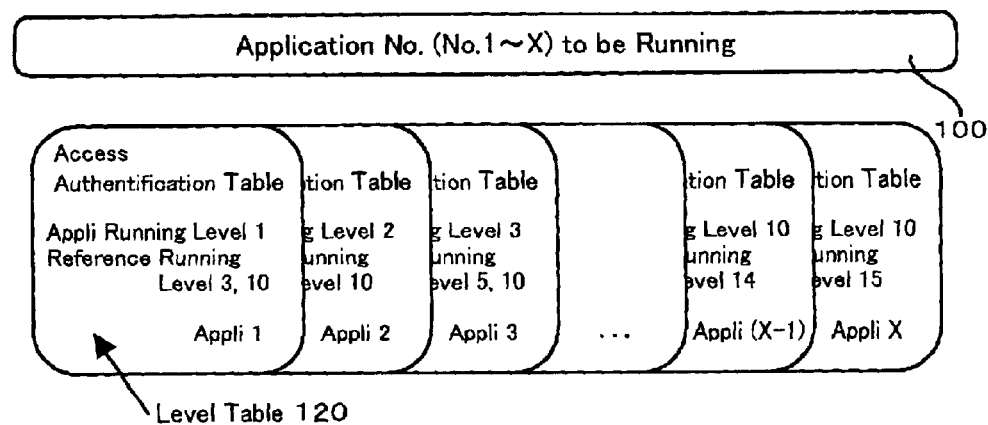

| Running Level 1 | | |
|---|---|---|
| Attribute (Read/Write/Code) | Region Header Address | Region Length |
| Read | x x x x  x x x x H | 0000 0100 H |
| Read/Write | x x x x  x x x x H | 0001 0000 H |
| Read/Write | x x x x  x x x x H | 0001 0000 H |
| Read/Write | x x x x  x x x x H | 0000 8000 H |
| Code | x x x x  x x x x H | 0010 0000 H |
| Code | x x x x  x x x x H | 0000 1000 H |

| Running Level 2 | | |
|---|---|---|
| Attribute (Read/Write/Code) | Region Header Address | Region Length |
| Read/Write | x x x x  x x x x H | 0001 0000 H |
| Read/Write | x x x x  x x x x H | 0000 8000 H |
| Code | x x x x  x x x x H | 0010 0000 H |
| | | |
| | | |
| | | |

. . .

| Running Level 15 | | |
|---|---|---|
| Attribute (Read/Write/Code) | Region Header Address | Region Length |
| Read | x x x x  x x x x H | 0000 0100 H |
| Read | x x x x  x x x x H | 0000 0080 H |
| Read/Write | x x x x  x x x x H | 0000 0080 H |
| Code | x x x x  x x x x H | 0010 0000 H |
| | | |
| | | |

FIG. 6

| | Program ID | |
|---|---|---|
| | Running Level A | |
| Attribute (Read/Write/Code) | Region Header Address | Region Length |
| Read | xxxx xxxx H | 0000 0100 H |
| Read | xxxx xxxx H | 0000 0080 H |
| Read/Write | xxxx xxxx H | 0000 0080 H |
| Code | xxxx xxxx H | 0010 0000 H |
| | | |
| | | |

Memory Information

PROGRAM INSTALLATION METHOD, PROGRAM INSTALLATION SYSTEM, PROGRAM EXECUTING APPARATUS, AND STORAGE MEDIUM

BACKGROUND OF THE INVENTION

1. Field of the Invention

The present invention relates to a program installation method for installing programs, a program installation system, a program executing apparatus, and a storage medium thereof, and more particularly to a program installation method, program installation system, program executing apparatus, and storage medium thereof having functions for preventing interference with existing programs.

2. Description of the Related Art

Higher security apparatuses are required in fields such as electronic commercial transactions. Particularly for program executing apparatuses running programs, a plurality of application programs can be freely installed in order to allow the installation of programs and the execution of installed programs.

Apparatuses in which an operating system or the like performs memory management have functions for performing resource management of the working memory region, but do not have functions for checking whether the newly installed program will interfere with other programs.

A problem with the conventional art is that even if installed programs perform an analysis or the like of the other programs, they cannot check for interference. Consequently, the installation of new programs on apparatuses having high-security programs installed has to be prohibited.

For example, an apparatus comprising an electronic money processing program for electronic commercial transactions includes security data such as a code key in its data. When a fraudulent program is installed, this fraudulent program may rewrite or read the security data. For this reason, once a high-security program is installed, the installation of other programs is prohibited.

However, it is desirable to have a plurality of programs operating on a single apparatus. When installation is prohibited, new programs must use another apparatus, which this is wasteful. For example, in the field of electronic commercial transactions, it is impossible to respond to requests for handling a plurality of applications for settlement processing of electronic money, debit cards, and credit cards with a single apparatus.

SUMMARY OF THE INVENTION

Consequently, it is an object of the present invention to provide a program installation method, program installation system, program executing apparatus, and storage medium for preventing interference among programs, even if newly installed.

It is another object of the present invention to provide a program installation method, program installation system, program executing apparatus, and storage medium for maintaining the security of programs, even if newly installed.

Furthermore, it is another object of the present invention to provide a program installation method, program installation system, program executing apparatus, and storage medium for preventing the installation of fraudulent programs.

In order to achieve these objects, the program installation method relating to the present invention comprises a step for receiving a program signature data, a step for checking for interference with other installed programs on the basis of the signature data, and a step for authorizing the installation of programs with which there is no interference.

In the present invention, a declaration of the signature data is elicited from the program which is being installed. Using this data, a check for interference among programs is performed, authentication is carried out, and the installation of programs with which there is interference is prevented or the installation of programs with which there is no interference is performed. It therefore becomes possible to install new programs while protecting high-security programs.

Also, in the present invention, the abovementioned checking step comprises a step for checking for the abovementioned interference based on memory usage information from the abovementioned signature data and memory usage information from the other installed programs mentioned above. It is therefore easy to check for interference among programs.

Furthermore, the present invention further includes a step for registering the abovementioned signature data of the abovementioned authorized program. It therefore becomes possible to make the interference check using the signature data.

Furthermore, in the present invention, the abovementioned receiving step comprises a step for receiving the abovementioned signature data and the abovementioned program. Efficient installation therefore becomes possible and can be applied when installing small programs.

Furthermore, in the present invention, the receiving step comprises a step for receiving the abovementioned signature data. The abovementioned step for authorizing installation comprises a step for requesting the abovementioned authorized program and receiving the abovementioned program. Useless transmission of unauthorized programs can therefore be prevented; this is effective for the installation of large programs.

BRIEF DESCRIPTION OF THE DRAWINGS

FIG. 5 is a diagram to explain the management information of the application manager in FIG. 4;

FIG. 6 is a diagram to explain the signature data in FIG. 4;

DESCRIPTION OF THE PREFERRED EMBODIMENTS

The preferred embodiments of the present invention is explained below in sections relating to the program executing apparatus, installation method, and other embodiments.

[Program Executing Apparatus]

Figure 1:
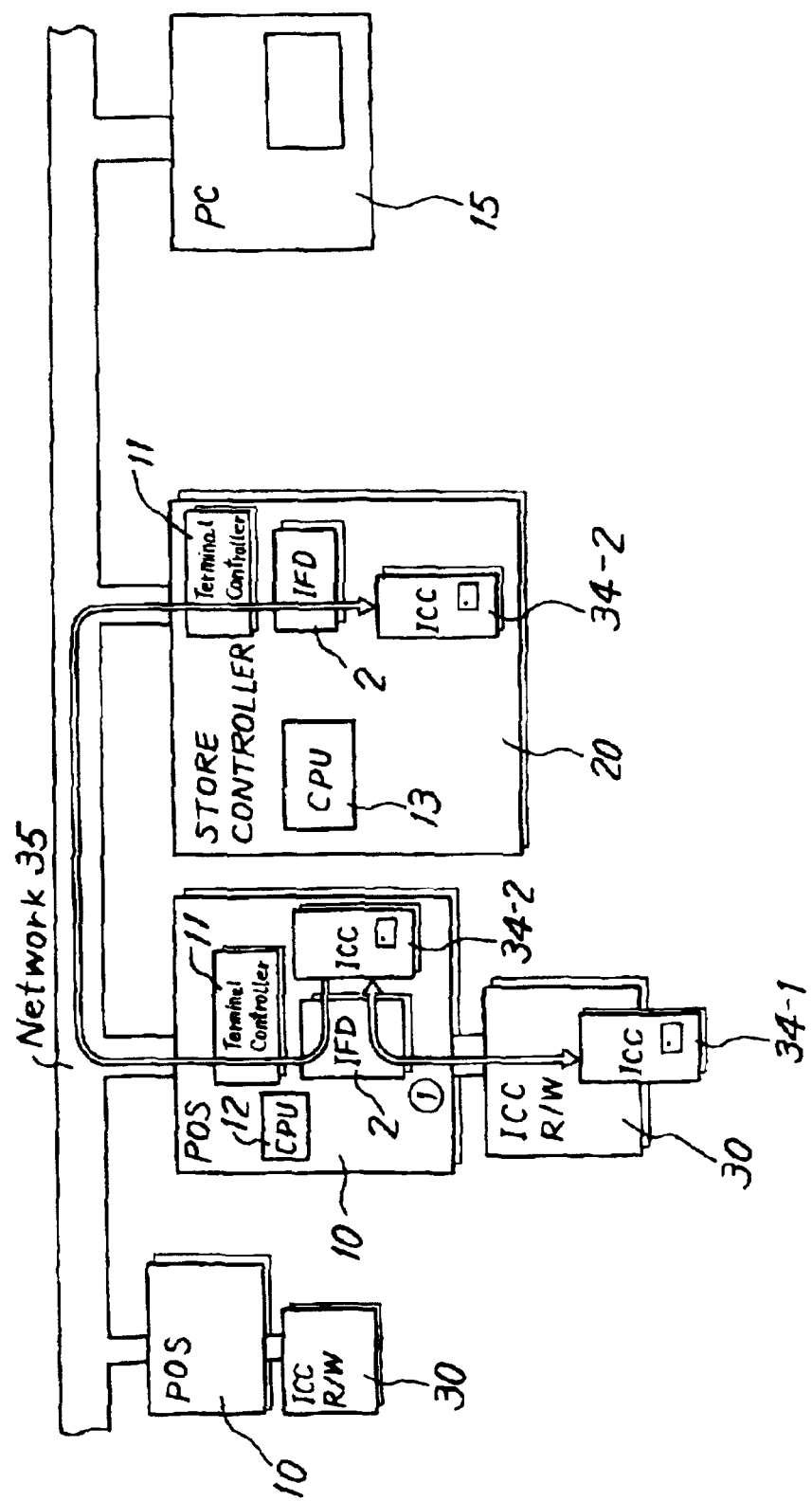
FIG. 1 is a block diagram of a system using the program executing apparatus relating to the first embodiment of the present invention.
Figure 2:
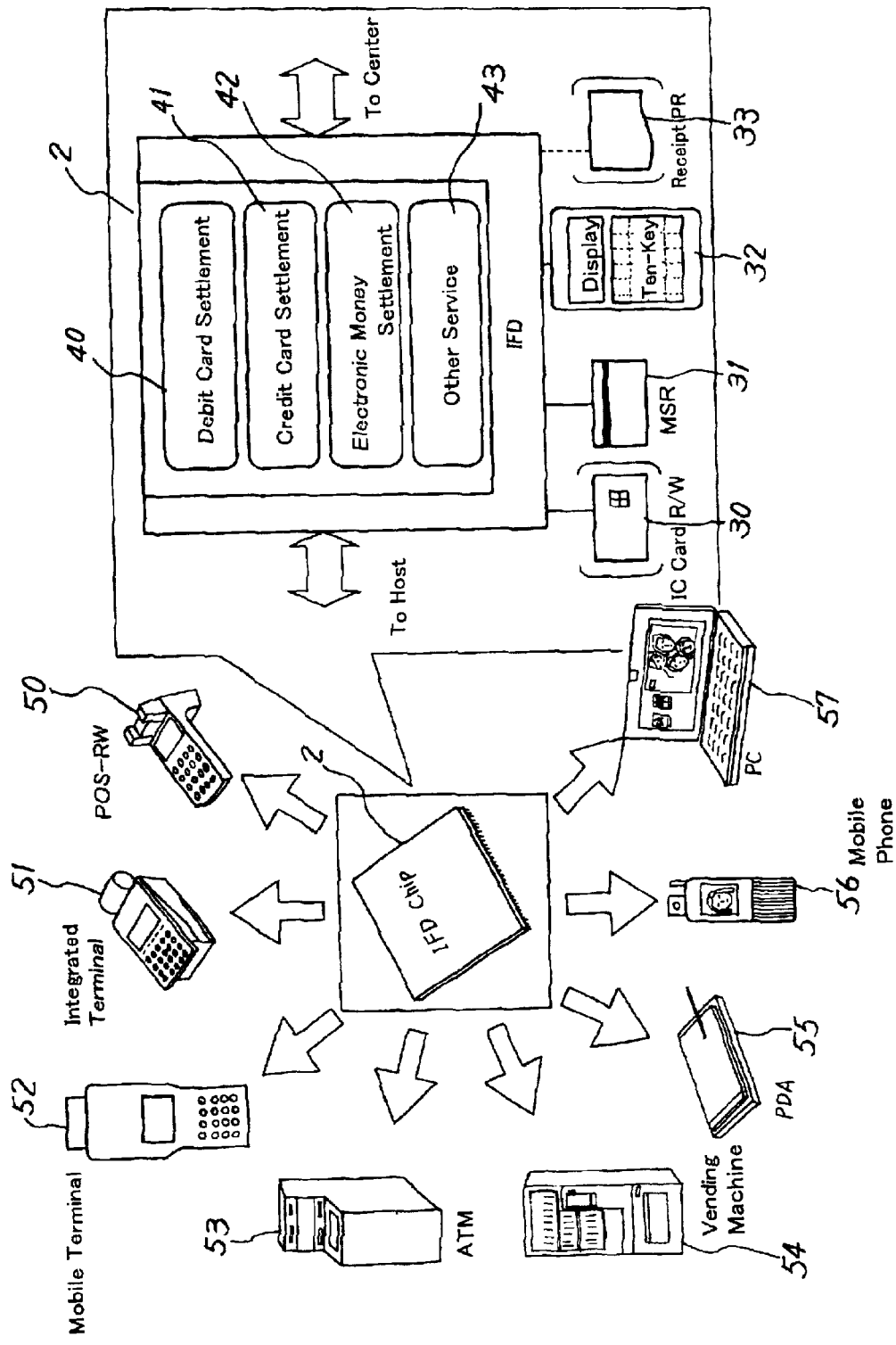
FIG. 2 is a diagram to explain the program executing apparatus in FIG. 1.
Figure 3:
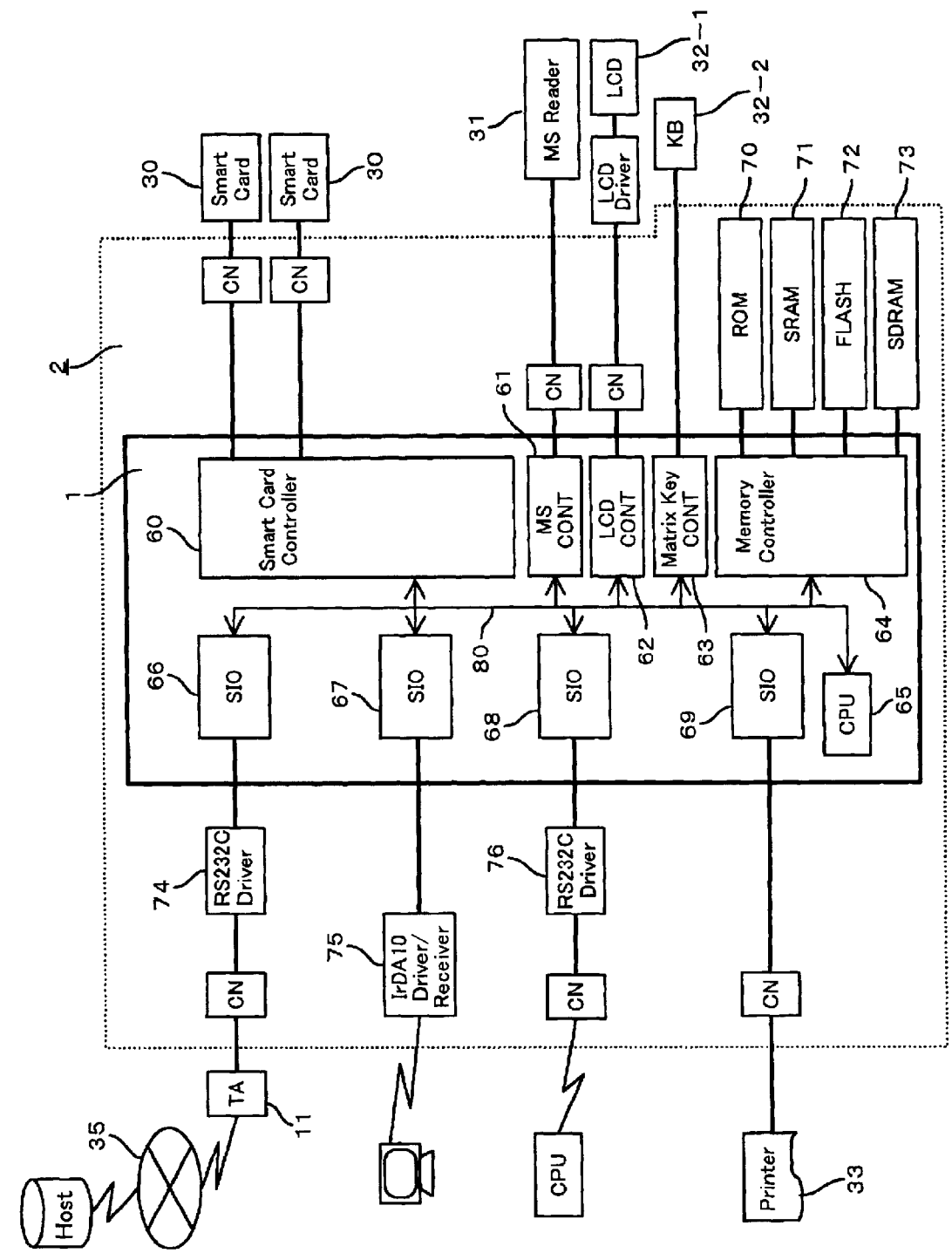
FIG. 3 is a block diagram of the program executing apparatus in FIG. 1.

FIG. 1 shows the configuration of a system using the program executing apparatus that is one embodiment of the present invention. FIG. 2 is a diagram to explain the program executing apparatus. FIG. 3 is a diagram of the constitution of this program executing apparatus.

FIG. 1 shows the configuration of a system using the program executing apparatus; this is a point of sale system (POS). A personal computer 15 for management, a store controller 20, and a plurality of POS terminals 10 are connected to a network 35 such as a LAN (Local Area Network). An IC card reader/writer 30 is connected to each POS terminal 10. A settlement LSI (IFD [interface device]) board 2 is provided as the program executing apparatus in the store controller 20 and each POS terminal 10; this board 2 directly handles settlement data.

In the system shown in FIG. 2, the system LSI board 2 is a card settlement LSI device and has debit card settlement functions 40, credit card settlement functions 41, electronic money settlement functions 42, and other service functions 43. For this reason, the IC card reader/writer 30, magnetic card reader 31, and display and keypad 32 are connected to the LSI board 2. As necessary, a receipt printer 33 is connected thereto as well. These settlement functions 40 to 43 are realized with programs executed by the CPU 65 (discussed below with FIG. 3) of the LSI device 2. Settlement programs for each are therefore installed.

Consequently, the inclusion of this LSI device 2 can add card settlement functions to the various electronic apparatuses 50 to 57. These electronic apparatuses are, for example, POS reader/writer 50, integrated terminal 51, mobile terminal 52, ATM (automatic teller machine) 53, vending machine 54, PDA (personal digital assistant) 55, portable telephone 56, and PC (personal computer) 57.

This card settlement system LSI board 2 is explained using FIG. 3. A system LSI device 1 is installed on the system LSI board 2. The system LSI device 1 comprises a smart card controller 60, MS control circuit 61, LCD control circuit 62, matrix KB control circuit 63, memory controller 64, CPU 65, serial input/output ports 66 to 69, and bus 80.

The smart card controller 60 reads and writes data to the IC card (called a smart card) through the IC card reader/writer 30. The MS control circuit 61 performs control of the MS (magnetic stripe) reader 31. The LCD control circuit 62 controls the display on the LCD (liquid crystal display) 32-1. The matrix KB control circuit 63 recognizes input from the ten key pad 32-2. The memory controller 64 performs input/output control for each type of memory (ROM 70, SRAM 71, FLASH 72, SDRAM 73) on the board 1. In order to input and output serial data, the serial ports 66 to 69 are connected to the drivers 74 to 76 on the board 1. These are all connected by the CPU bus 80.

Each settlement application program is installed in FLASH 72 from the personal computer 15 for management in FIG. 1. The CPU 65 executes the corresponding settlement application program according to the designated settlement. Settlement data includes data necessary for security such as a password, amount of money, and account number and is therefore encrypted. The settlement application program contains the code key and so forth for encrypting the settlement data.

The operation of the system is explained using FIG. 1. A customer's IC card 34-1 communicates with the POS IC card 34-2 through the IFD 2. The POS IC card 34-2 communicates with the IC card 34-2 of the store controller 20 through the IFD 2, terminal controller 11, network 35, terminal controller 11, and IFD 2.

For example, when an electronic settlement is performed with the IC card, data on the customer's IC card 34-1 are stored in the POS IC card 34-2 through the IFD 2. Data storage in the POS IC card 34-2 are then stored on the IC card 34-2 of the store controller 20 through the IFD 2, terminal controller 11, network 35, terminal controller 11, and IFD 2.

In this system, because the route of the electronic settlement data is closed by the IFD 2, there is no risk of the settlement data (password, account number, balance, etc.) being leaked and security is therefore high.

As discussed above, however, an apparatus on which an electronic money processing program for electronic commercial transactions is loaded includes security data such as code keys as its data. Therefore, when a fraudulent program is installed, the security data may be rewritten or read by this fraudulent program. However, if installation is prevented, this is inconvenient because it becomes impossible to install application programs for handling new electronic settlements. Consequently, the installation method relating to the present invention discussed below is particularly effective for such purposes. It can of course be applied to program executing apparatuses with other purposes.

[Installation Method]

Figure 4:
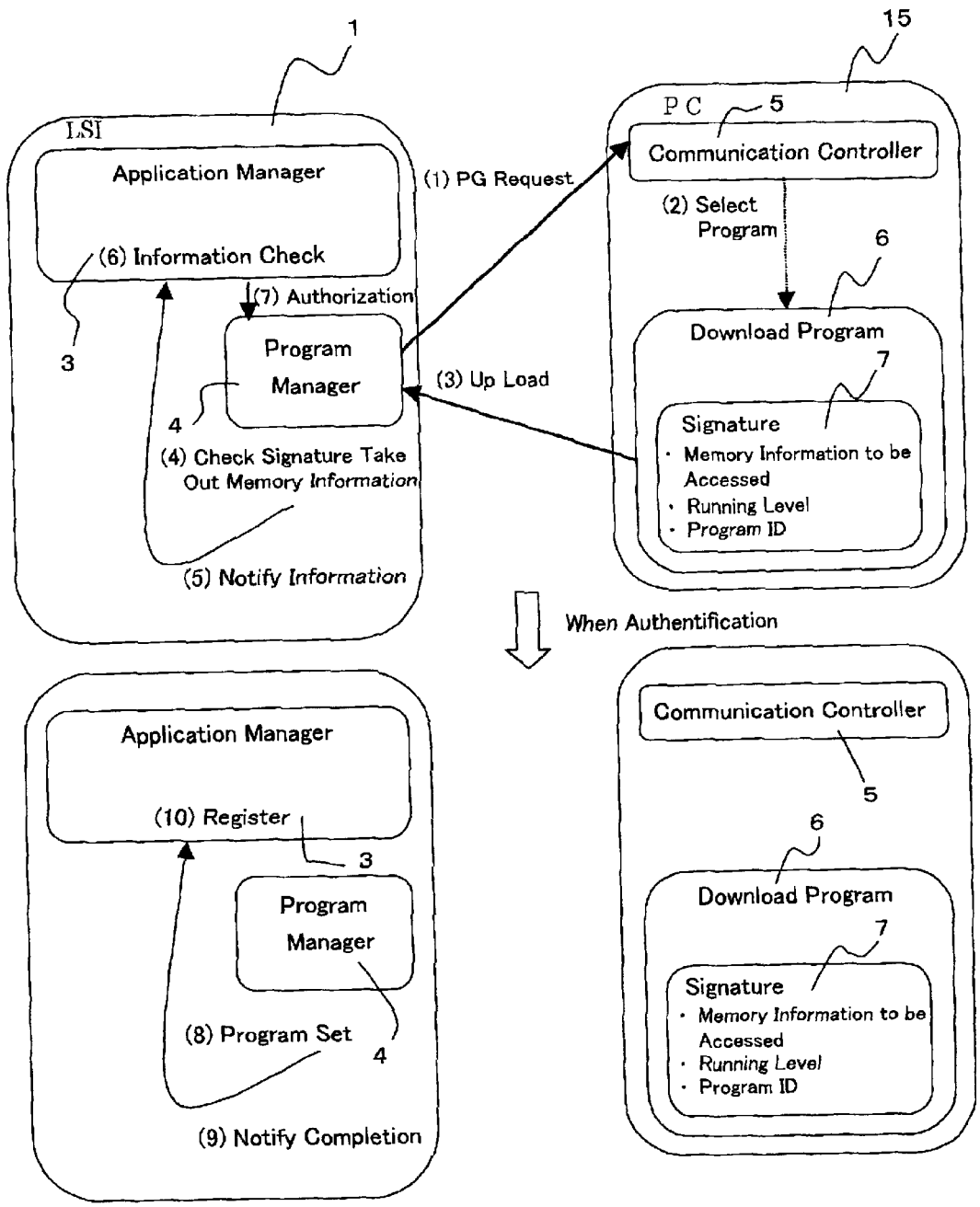
FIG. 4 is a diagram to explain the installation process in the first embodiment of the present invention.
Figure 7:
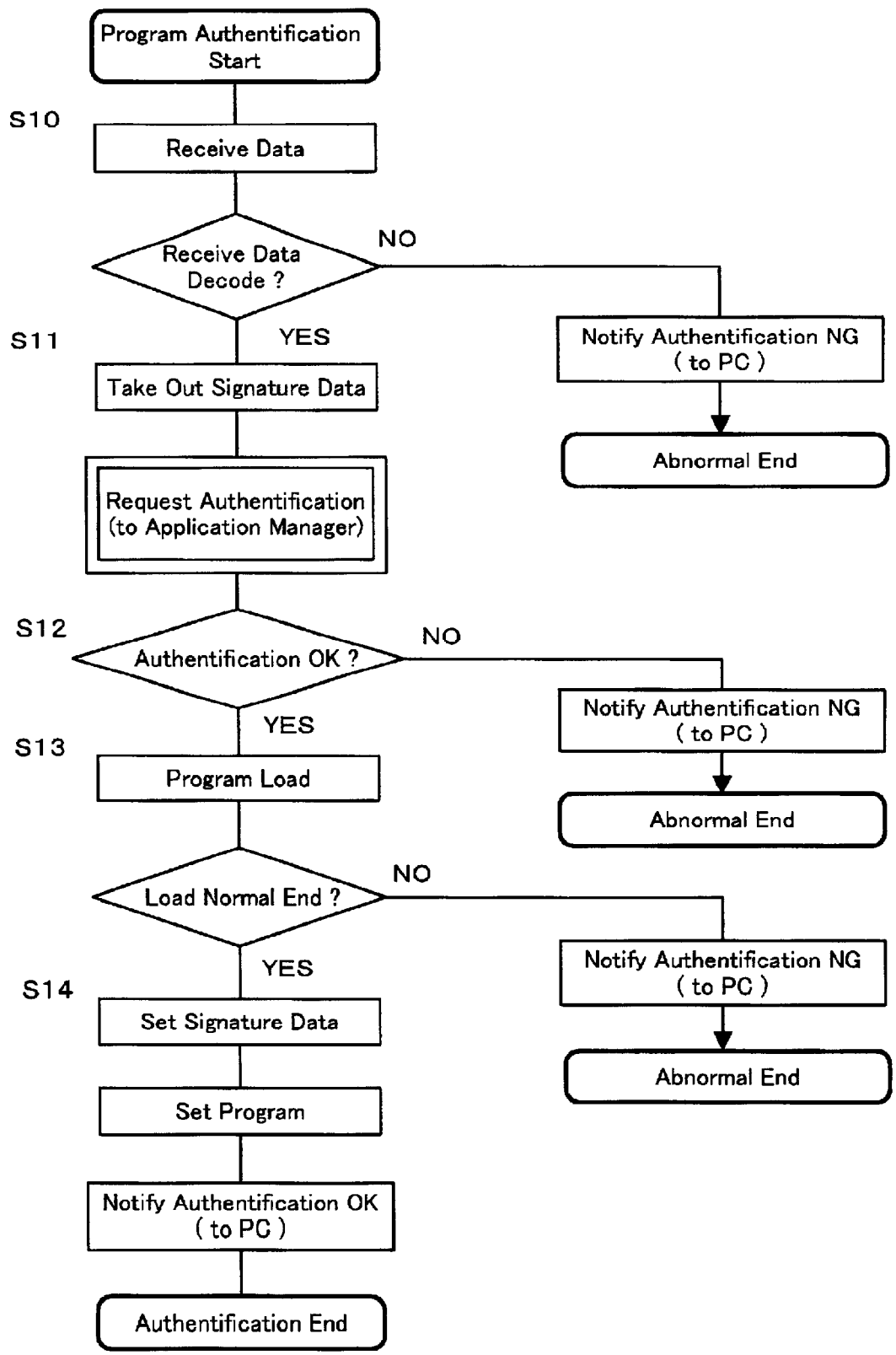
FIG. 7 is a flowchart for the installation process of the program manager in FIG. 4.
Figure 8:
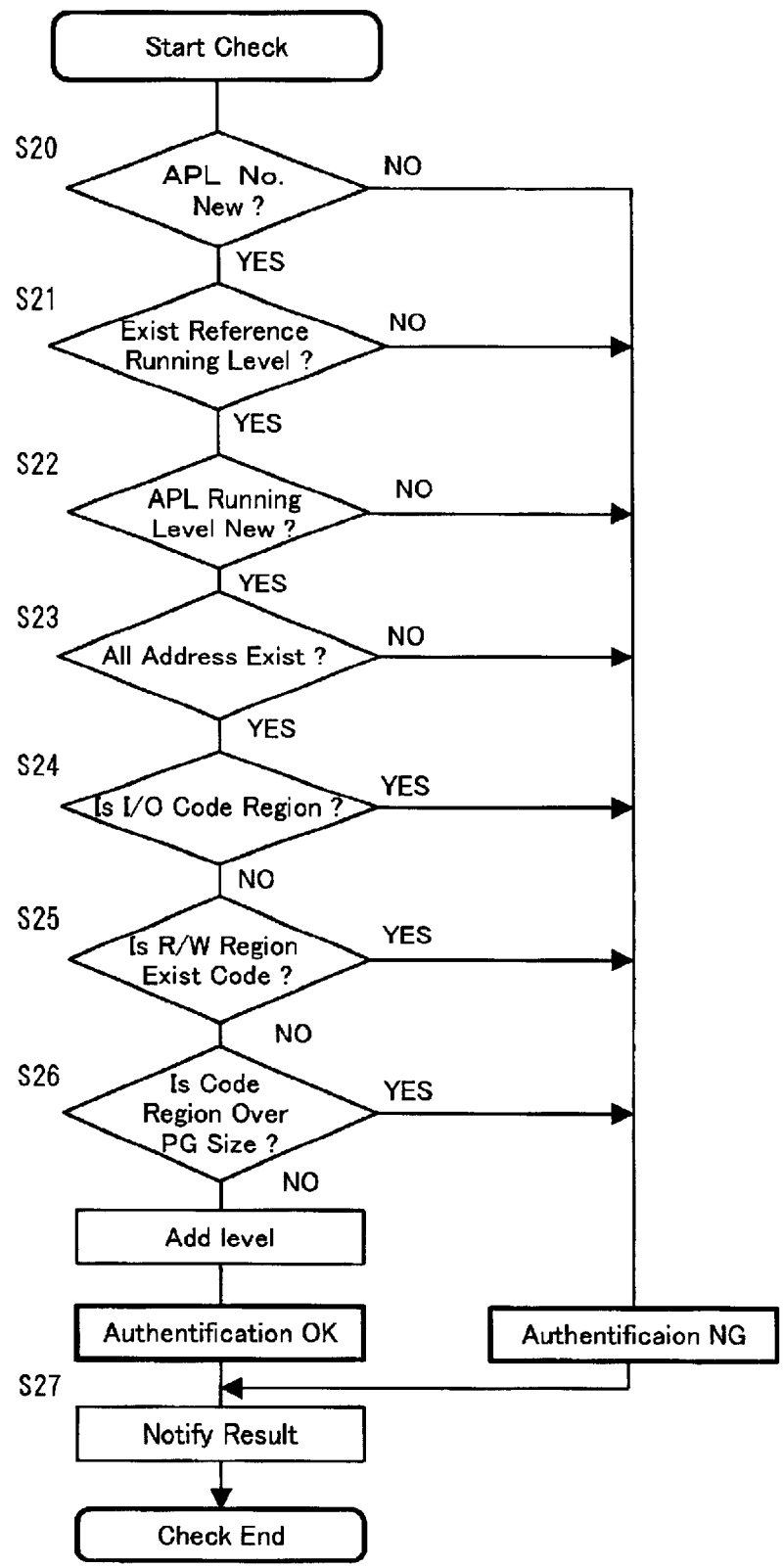
FIG. 8 is a flowchart for the authentication process of the application manager in FIG. 7.

FIG. 4 is a diagram explaining the installation method that is one embodiment of the present invention. FIG. 5 is a diagram explaining the management information of the application program registered to the application manager 3 in FIG. 4. FIG. 6 is a diagram explaining the signature information 7 of the download program 6. FIG. 7 is a flowchart of the processing by the program manager in FIG. 4. FIG. 8 is a flowchart of the checking process of the application manager 3 in FIG. 4.

As shown in FIG. 4, the program manager 4 and application manager 3 are provided in the LSI device 1. These are realized by the execution of the programs. The program manager 4 manages the entire program and controls installation as well. The application manager 3 checks whether the application program operates according to the management information. In the present invention, the application manager 3 checks for program interference and performs authentication at the time of installation.

The personal computer 15 comprises the communications control portion 5 and download program 6. In the present invention, the signature data 7 are provided in the download program 6. AS shown in FIG. 6, the signature data 7 comprise memory information that is accessed by that program, the running level, program ID, and so forth. The memory information comprises the associated (read/write/code) region header address and the region length. Read means to read, write means to write, and code indicates the location at which the program is stored.

Meanwhile, the management information shown in FIG. 5 is registered at the application manager 3. The ID of the application program installed is registered at application No. 100. The running level of the application and the reference running level for each installed application program are stored in the access authorization table 110. The running level is a pointer for the running level table 120 and registers the memory information discussed above to the table 120. The reference running level is the running level of the library (for example, functional calculations) referenced by that application.

The installation operation is explained with reference to FIG. 4.

(1) A program request from the program manager 4 to the communications control portion 5 is generated.

(2) The communications control portion 5 selects the designated download program 6. The signature data 7 are included in that download program 6.

(3) The download program 6 is encrypted and uploaded to the program manager 4.

(4) As shown in FIG. 7, the program manager 4 decrypts the download program 6, performs a check, and takes up the signature data.

(5) The program manager 4 notifies the application manager 3 of the signature data 7 that has been taken up.

(6) As discussed in FIG. 8, the application manager 3 references the management information in FIG. 5 and checks for interference among programs with the signature data 7.

(7) The application manager 3 notifies the program manager 4 of the check results (authentication results).

(8) The program manager 4 determines whether installation is authorized and when authorized, sets the download program 6 opened in a working area to the designated region of memory.

(9) When it sets the program, the application manager 4 notifies the application manager 3 that completion has occurred. The application manager 4 registers the signature data 7 discussed above with the management information.

On the other hand, when installation is not authorized, the program manager 4 deletes the download program 6 that is opened the working area. In other words, installation is not performed.

In this way, a declaration of signature data including memory information is elicited from the program to be installed. A check for interference among programs is performed based on that data, authentication is performed, and the installation of programs with which there is interference is prevented or the installation of programs with which there is no interference is performed. It therefore becomes possible to install new programs while protecting high-security programs.

Also, the signature data used in the authentication discussed above is memory information and can be used without further processing for the management information of the application manager 4. For this reason, as signature data are declared, the contents of the declaration can be used effectively.

Next, the installation processes (4) through (9) of the program manager 4 discussed above explained using FIG. 7.

(S10) Decrypt the encrypted download program 6 and determine whether decryption was performed normally. If decryption was not performed normally, send authentication NG to the personal computer 15 and abend (end abnormally). For example, delete the download program opened in the working region.

(S11) If decryption was normal, take up the signature data 7 of the download program 6 and request authentication from the application manager 3. The application manager 3 performs notification of the authentication results according to the process in FIG. 8 discussed below.

(S12) If the notified authentication results are not OK, send the authentication NG to the personal computer 15 and abend. For example, delete the download program opened in the working region.

(S13) If the authentication is OK, load the program to the designated region. When loading abends, send authentication NG to the personal computer 15 and abend.

(S14) When loading ends normally, set the signature data 7 in the application manager 3, set the program information, send authentication OK to the personal computer 15, and end the installation.

Next, the authentication processing of the application manager 3 in Step S11 is explained using FIG. 8.

(S20) Compare the program ID of the signature data with the program ID registered in FIG. 5 and determine whether the application number is new. If it is not new, send authentication NG because an existing program will be overwritten. In other words, prevent fraudulent overwriting.

(S21) Determine whether the reference running level of the signature data is present. The reference running level indicates a library that is referenced; if the reference running level is not present, send the authentication NG because the reference library does not exist. In other words, reject programs that will abend without referencing being possible.

(S22) Determine whether the application running level is new. If the running level is not new, send authentication NG because there will be interference with an existing program.

(S23) When the application running level is not new, determine whether an address that is not present in the apparatus is accessed from the address shown in the memory information. Send the authentication NG if the address is not present. In other words, programs that cannot be accessed.

(S24) Based on the memory information, determine whether each type of register (I/O) region is the code region (program storage region). The registers are rewritten so that they can be used by each program. For this reason, the security of the program cannot be maintained even if this type of program is loaded; therefore, send the authentication NG.

(S25) Determine whether the read, read/write regions of the memory information read/write to data regions which are code regions of already installed applications. In cases where the read and read/write regions of the memory information read/write to data regions which are code regions of already installed applications, reading/writing of the application program itself will be performed by this program and interference will occur. Therefore, send the authentication NG because the security of existing applications cannot be maintained.

(S26) Determine whether the size of a program which has actually been received matches the size designated as the code region. Send the authentication NG if these do not match. However, if they do match, add that level to the management information of the application manager 3 and send the authentication OK.

(S27) Send these authentication results to the program manager and end.

Interference among programs is checked for on the basis of the memory information in this way; when there will be interference, installation is not performed because security cannot be maintained. Meanwhile, the installation of programs with which there is no interference is authorized. It therefore becomes possible to install new programs while protecting high-security programs.

It is also checked whether the security of installed programs can be maintained. For this reason, the security of installed programs can be maintained.

[Other Embodiments]

Figure 9:
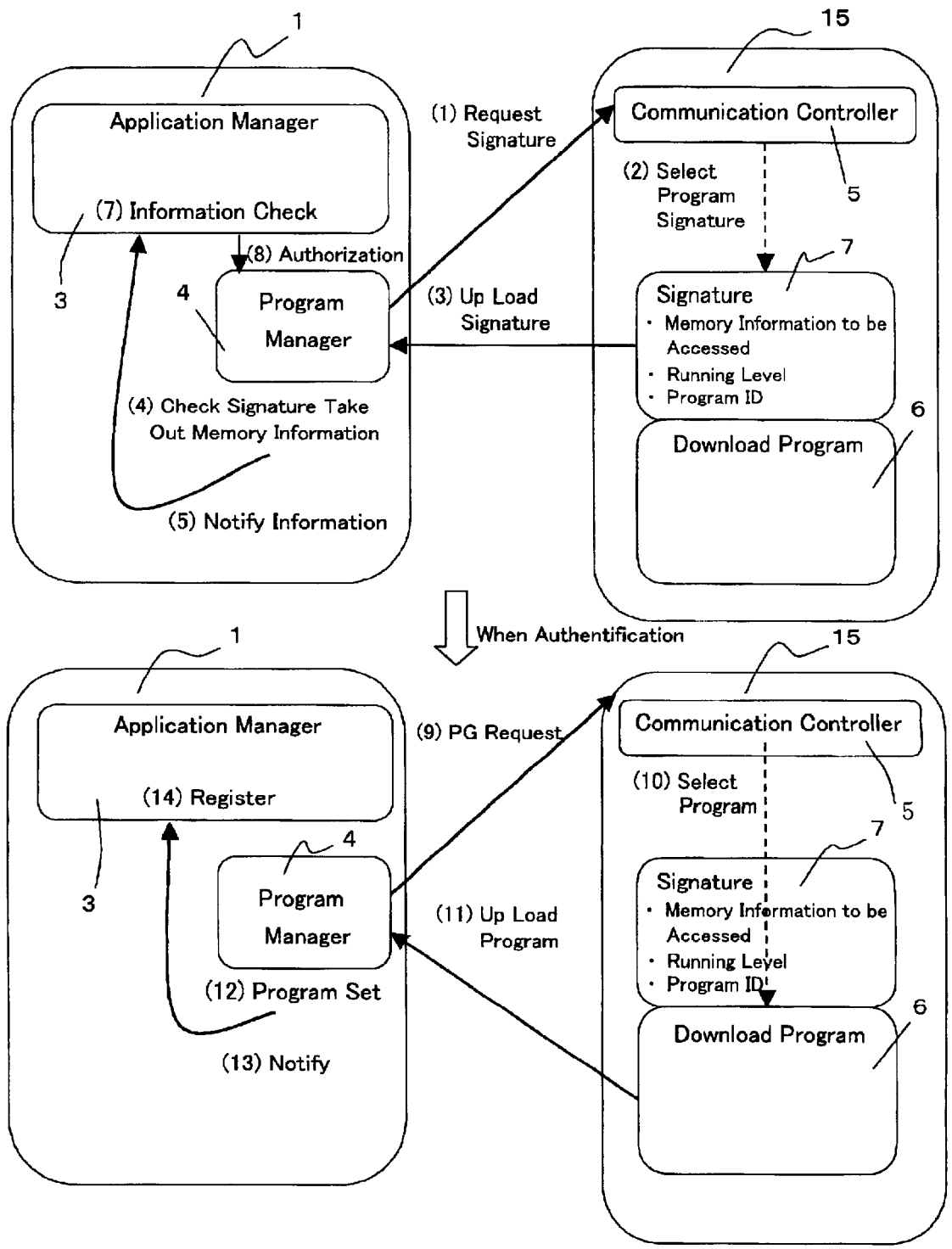
FIG. 9 is a flowchart of the installation process for other embodiments of the present invention.

FIG. 9 is a drawing explaining the installation process for another embodiment of the present invention. In the embodiment shown in FIG. 4, the entire program including the signature is downloaded once; however, the present embodiment requests only the signature data (1), uploads and authenticates the signature data (3) to (8), requests a program when authorized, then performs the uploading and writing of the program 6 itself. An advantage of this is that the time and effort for downloading a program that cannot be used is prevented; this is also effective in the case of large sized programs. Conversely, for small sized programs, the method of downloading the signature and program at once, as in FIG. 4, is efficient.

In addition to the embodiment discussed above, the present invention can have the following forms.

(1) The explanation concerned electronic money settlement programs as high-security programs; however, the present invention can also be applied to other programs requiring security, discussed above, such as debit card settlement programs and credit card settlement programs.

(2) The explanation concerned a settlement system LSI device as the program executing apparatus; however, the present invention can also be applied to other program executing apparatuses.

The present invention was explained above using the embodiments. The present invention can have many forms within the scope of the invention; these are not excluded from the scope of the present invention.

As explained above, with the present invention, signature data are requested from a program to be installed; checks for interference among programs and authentication are performed based on this, and the installation of programs with which there is interference is prevented or the installation of programs with which there is no interference is performed. For this reason, it becomes possible to install new programs while protecting high-security programs.

What is claimed is:

1. A program installation method comprising:
    a step of receiving a program's signature data;
    a step of checking for interference with other already installed programs on the basis of said signature data; and
    a step of authorizing the installation of programs with which there is no interference,
    wherein said checking step comprises a step for checking for said interference based on memory usage information in said signature data of the program to be installed indicating memory area to be used by said program after installation and memory usage information of said other already installed programs.

2. The program installation method according to claim 1, wherein said checking step further comprises a step for checking for said interference of whether or not memory usage information in said signature data includes a use of register area.

3. The program installation method according to claim 1, further comprising a step for registering said signature data of said authorized program.

4. The program installation method according to claim 1, wherein said receiving step comprises a step for receiving said signature data and said program.

5. The program installation method according to claim 1, wherein said receiving step comprises a step for receiving said signature data, and
    said step for authorizing installation comprises a step for requesting said authorized program and receiving said program.

6. A program executing apparatus comprising:
    memory for storing installed programs; and
    a processor for executing said programs;
    wherein said processor receives a program's signature data, checks for interference with other already installed programs based on said signature data, and authorizes installation of programs with which there is no interference,
    and wherein said processor checks for said interference based on memory usage information in said signature data of the program to be installed indicating memory area to be used by said program after installation and memory usage information of said other already installed programs.

7. The program executing apparatus according to claim 6, wherein said processor checks for said interference of whether or not memory usage information of said signature data includes a use of register area.

8. The program executing apparatus according to claim 6, wherein said processor registers said signature data of said authorized program.

9. The program executing apparatus according to claim 6, wherein said processor receives said signature data and said program.

10. The program executing apparatus according to claim 6, wherein said processor receives said signature data, and when said installation is authorized, requests said authorized program, and receives said program.

11. A program installation method comprising:
    a step of uploading at least a signature data of a program in response to a program request;
    a step of receiving the signature data of said program;
    a step of checking for interference with other already installed programs on the basis of said signature data; and
    a step of authorizing the installation of programs with which there is no interference,
    wherein said checking step comprises a step for checking for said interference based on memory usage information in said signature data of the program to be installed indicating memory area to be used by said program after installation and memory usage information of said other already installed programs.

12. The program installation method according to claim 11, wherein said checking step comprises a step for checking for said interference of whether or not memory usage information of said signature data includes a use of register area.

13. The program installation method according to claim 11, further comprising a step of registering said signature data of said authorized program.

14. The program installation method according to claim 11, wherein said receiving step comprises a step of receiving said signature data and said program.

15. The program installation method according to claim 11, wherein said receiving step comprises a step of receiving said signature data, and
    said step of authorizing installation comprises a step of requesting said authorized program and receiving said program.

16. A program installation system comprising:
    a first apparatus for uploading at least a signature data and a program in response to a program request; and
    a second apparatus for receiving the signature data of said program, checking for interference with other already installed programs on the basis of said signature data, and authorizing the installation of programs with which there is no interference,
    wherein said second apparatus checks for said interference based on memory usage information in said signature data of the program to be installed indicating memory area to be used by said program after installation and memory usage information of said other already installed programs.

17. The program installation system according to claim 16, wherein said second apparatus checks for said interference of whether or not memory usage information of said signature data includes a use of register area.

18. The program installation system according to claim 16, wherein said second apparatus registers said signature data from said authorized program.

19. The program installation system according to claim 16, wherein said second apparatus receives said signature data and said program.

20. The program installation system according to claim 16, wherein said second apparatus receives said signature data, and when said installation is authorized, requests said authorized program and receives said program.

21. A storage medium for storing programs for implementing a program installation method, the medium comprising:

a program for receiving signature data of a program;

a program for checking for interference with other already installed programs on the basis of said signature data; and a program authorizing the installation of programs with which there is no interference, wherein said checking program checks for said interference based on memory usage information in said signature data of the program to be installed indicating memory area to be used by said program after installation and memory usage information of said other already installed programs.

22. The storage medium according to claim 21, wherein said checking program checks for said interference of whether or not memory usage information of said signature data includes a use register area.

23. The storage medium according to claim 21, further stored program for registering said signature data of said authorized program.

24. The storage medium according to claim 21, wherein said receiving program comprises a program for receiving said signature data and said program.

25. The storage medium according to claim 21, wherein said receiving program comprises a program for receiving said signature data, and said program for authorizing installation comprises a program for requesting said authorized program and receiving said program.

* * * * *